April 14, 1964 H. LEVICK 3,129,286

SIGNAL DISTORTION ANALYZER

Filed Jan. 23, 1961 4 Sheets-Sheet 1

INVENTOR.
HERBERT LEVICK

BY S. C. Yuter

ATTORNEY

SIGNAL DISTORTION ANALYZER

Filed Jan. 23, 1961 4 Sheets-Sheet 2

*INVENTOR.*
HERBERT LEVICK

*BY* S. C. Yuter

ATTORNEY

SIGNAL DISTORTION ANALYZER

Filed Jan. 23, 1961 4 Sheets-Sheet 3

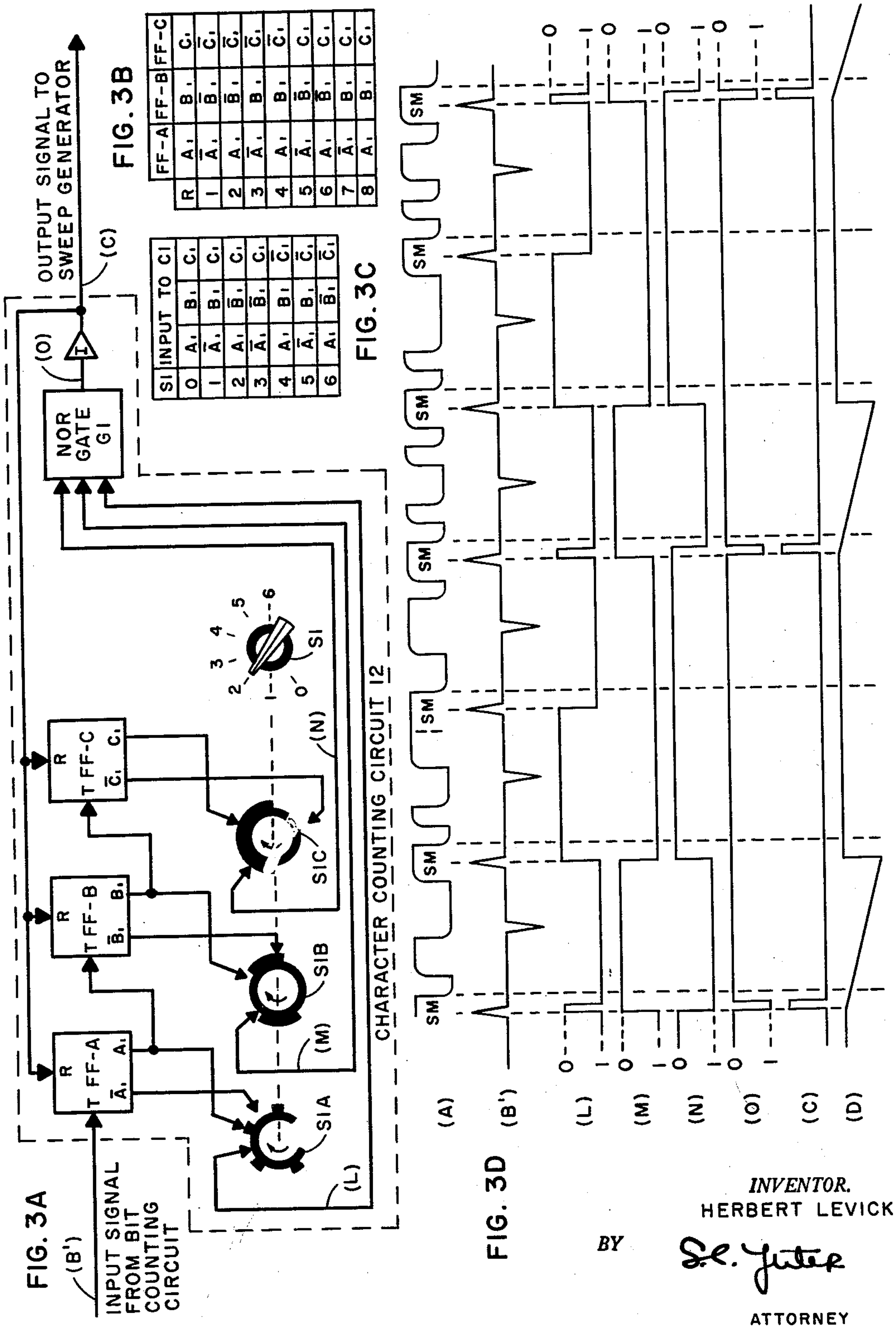

FIG. 3A, FIG. 3B, FIG. 3C, FIG. 3D

FIG. 3B

| | FF-A | FF-B | FF-C |
|---|---|---|---|
| R | $A_1$ | $B_1$ | $C_1$ |
| 1 | $\bar{A}_1$ | $\bar{B}_1$ | $\bar{C}_1$ |
| 2 | $A_1$ | $\bar{B}_1$ | $\bar{C}_1$ |
| 3 | $\bar{A}_1$ | $B_1$ | $\bar{C}_1$ |
| 4 | $A_1$ | $B_1$ | $\bar{C}_1$ |
| 5 | $\bar{A}_1$ | $\bar{B}_1$ | $C_1$ |
| 6 | $A_1$ | $\bar{B}_1$ | $C_1$ |
| 7 | $\bar{A}_1$ | $B_1$ | $C_1$ |
| 8 | $A_1$ | $B_1$ | $C_1$ |

FIG. 3C

| S1 | INPUT TO C1 | | |
|---|---|---|---|
| 0 | $A_1$ | $B_1$ | $C_1$ |
| 1 | $\bar{A}_1$ | $B_1$ | $C_1$ |
| 2 | $A_1$ | $\bar{B}_1$ | $C_1$ |
| 3 | $\bar{A}_1$ | $\bar{B}_1$ | $C_1$ |
| 4 | $A_1$ | $B_1$ | $\bar{C}_1$ |
| 5 | $\bar{A}_1$ | $B_1$ | $\bar{C}_1$ |
| 6 | $A_1$ | $\bar{B}_1$ | $\bar{C}_1$ |

*INVENTOR.*
HERBERT LEVICK

*BY* S. C. Yuter

ATTORNEY

SIGNAL DISTORTION ANALYZER

Filed Jan. 23, 1961 4 Sheets-Sheet 4

INVENTOR.
HERBERT LEVICK

BY S.C. Yuter

ATTORNEY

United States Patent Office 3,129,286
Patented Apr. 14, 1964

3,129,286
SIGNAL DISTORTION ANALYZER

Herbert Levick, Fairfield County, Conn., assignor to Stelma, Incorporated, Stamford, Conn., a corporation of Connecticut Filed Jan. 23, 1961, Ser. No. 84,312
12 Claims. (Cl. 178—69)

This invention relates to a signal distortion analyzer, and more particularly to a device for coded combination of signals representing characters on a display means such as a calibrated cathode-ray tube.

When information is transmitted as signals in a binary code, the transmitted signal is subject to several types of distortion due to imperfections in the encoding device, the transmitting device, the transmission link, and the receiving device. This distortion can be divided into the following general categories: (1) bias distortion, (2) characteristic distortion, (3) end distortion, (4) signal mutilation, (5) periodic distortion, and (6) random distortion.

"Bias distortion" refers to the condition where all of the signal pulses representing a given binary state are wider than their desired or theoretical pulse width. If the binary "1" pulses, which are known in telegraphy as "marks," are wider than they should be, the distortion is called "marking bias distortion." If the binary "0" pulses, which are known in telegraphy as "spaces," are wider than they should be, the distortion is called "spacing bias distortion." Marking and spacing bias distortion are mutually exclusive, because lengthening the marks of a signal necessarily shortens its spaces, and vice-versa. Both types of bias distortion spring from time delays in the signal transitions.

"Characteristic distortion" arises when a signal transition occurs before its transmission link has reached the stready state current value corresponding to the previous signal transition. Suppose, for example, that a mark is represented by a presence of a plus sixty ma. current in a D.C. transmission line and a space by no current. In long transmission lines, which necessarily have a high shunt capacitance, it will take an appreciable time for the line current to build up after a mark voltage is applied to the line by a telegraph transmitter. In many cases the mark voltage will be removed before the line current reaches sixty milliamperes, and in these cases the amplitude of the current pulses will be decreased by an amount dependent on the impedance characteristics of the transmission line which will decrease the width of the information signals at the receiving device. This shortening is called characteristic distortion. Unlike bias distortion, characteristic distortion is not constant, but varies as a function of modulation. For example, if a transmitted code character contains four adjacent marks, the transmission line will usually have sufficient time to reach the sixty milliampere level, so there will be no characteristic distortion in this character even though there may be serious characteristic distortion in characters containing only one or two marks.

"End distortion," which occurs only in start-stop telegraph codes, is a type of distortion that affects all of the information bits (in marks and spaces) of the transmitted signals representing the characters but not the stop-start bits. End distortion can only be present when the information bit signals and start-stop bit signals are generated in separate modulators, which allows the signal transitions of one modulator to become biased (delayed by a fixed time) without affecting the signal transitions of the other modulator. With end distortion, the mark-to-space transitions within a character are displaced from their theoretical positions with respect to the stop mark-start space transition which started the characer, while the space-to-mark transitions remain in place. This displacement distinguishes end distortion from ordinary bias distortion, which affects both the information bits and start-stop bits by the same amount, because with ordinary bias distortion it is the space-to-mark transitions which become displaced with respect to their theoretical positions while the mark-to-space transitions remain in placed.

Since there are two types of bias distortion, there will also be two types of end distortion—marking end distortion, and spacing end distortion. With marking end distortion, the mark-space transitions of the character bits will be late with respect to their stop mark-start space transition, and with spacing end distortion they will be early.

It should be noted here that a psuedo end distortion can be obtained in 7.42 unit telegraph codes, which have a 1.42 unit stop mark. With these codes it is possible to have a characteristic distortion which shortens the 1 unit marks but not 1.42 unit marks. The same indications occur as in end distortion in every code character which did not have adjacent marks in the information bits, because the adjacent marks, being longer than the 1.42 unit stop mark, would also be undistorted.

When independent modulators are used for the information bits and start-stop bits, there are several other types of distortion which can arise, although they are not as common as end distortion, and have not yet been given distinct names. It is possible to have a bias distortion in the start-stop modulator and no distortion in the information modulator, which would displace both the mark-space transitions and the space-mark transitions within a character by the same amount, and in the same direction, with reference to the stop-start space transition. It is also possible to have a differing amount of bias distortion in the two modulators, or to have a marking bias distortion in one modulator and a spacing bias distortion in the other. These two conditions would also displace both the mark-space transitions and the space-mark transitions within a character, but not by the same amount, and not necessarily in the same direction.

"Signal mutilation" refers to the condition where a signal element or portion thereof is changed from a space to a mark, or vice-versa, in the transmission link. Signal multilation can be caused by nose, crossfire, or intermittent breaks in the transmission link.

"Periodic distortion' 'is a cyclical fluctuation in the signal transition times caused by periodic disturbances in the transmission link or transmitter, such as interference from foreign A.C. currents, or variations in the contact time of brushes in the transmitter distributor. "Random distortion" is similar to periodic distortion except in being caused by random disturbances rather than periodic disturbances. Random distortion can be cause by power supply transients, transmission line noise, or the like, and it appears as a relatively high speed jitter in the signal transition times.

In addition to the above described types of distortion, which are signal transition time distortions, there are other types of distortion which change the waveform of the transmitted pulses but not their transition times. As a rule, however, these waveform distortions can be ignored in telegraph systems because they do not influence the accuracy of communications. But the transition time distortions have a most vital bearing on the accuracy of communication, and they cannot be ignored; it is in fact essential to have a quantitative measure of transition time distortion to insure accurate communication and to isolate faults if the communication should become inaccurate. Suppose, for example, that a telegraph receiver starts printing out incoherent words in the middle of a message. Does the fault lie in the transmitting end of the system, or in the transmission line, or in the receiver? To answer this question the incoming (or outgoing signals must be examined for distortion. A simple qualitative measure, however, is not sufficient, because the telegraph receiver is designed to tolerate a specific degree of distortion in its input signal. A malfunction cannot be pinpointed to the transmitter by the mere presence of bias distortion on the incoming signal, because the malfunction may be in the receiver if the degree of bias distortion is within the limits of distortion which the receiver is designed to tolerate. Therefore both a qualitative and a quantitative measure of distortion are required to isolate system faults.

Furthermore, even when the telegraph system is operating properly it is desirable to monitor the incoming (or outgoing) signals in order to detect malfunctions the moment they arise. This is especially true in military telegraph systems, where accuracy is vital and time precious, particularly when the transmission is in cipher, which appears garbled until deciphered, or when radio silence must be observed by the receiving station. Suppose, for example, that a message is sent by radio-telegraph to a ship at sea which is under orders to maintain absolute radio silence. Without a continuous measure of output signal distortion the sender would have no way of knowing that his message had been garbled by a malfunction in his transmitter. For these and other reasons it is highly desirable to have a telegraph distortion analyzer which is adapted to give a continuous, quantitative measure of all the significant distortions in telegraph signals—(1) bias distortion, (2) characteristic distortion, (3) end distortion, (4) signal mutilation, (5) periodic distortion, (6) random distortion, and (7) any other distortion which effects signal transition times.

The problems encountered in designing a distortion analyzer employing a cathode-ray tube (C.R.T.) as a means of display will be better appreciated by considering the characteristics of the various types of distortion it must measure. Bias distortion and end distortion present no critical problems because they are uniform over long periods of time and can be measured on either a relatively short persistence C.R.T. display or a long persistence C.R.T. display. The other types of distortion, however, present conflicting requirements in terms of display persistance time. Characteristic distortion, which changes from character to character, cannot be accurately measured on a relatively fast C.R.T. display, and neither can relatively fast periodic distortion or random distortion. But on a relatively slow display it is very difficult to distinguish the various types of distortion from each other, because their characteristic movements become obscured by the sluggish response of the cathode-ray tube. Random distortion, for example, is distinguished from characteristic distortion and periodic distortion primarily on the basis of its random nature. On a fast C.R.T. display the random distortion will appear as a high-speed jitter whose random character is clearly evident to the observer. But on a slow C.R.T. display random distortion will appear only as a thickening of the trace of the signal transitions, which could also be caused by characteristic distortion or high frequency periodic distortion. Thus there is an inherent conflict between the conditions necessary for measuring characteristic distortion and distinguishing it from random distortion or periodic distortion. This problem was never solved by the prior art devices.

Accordingly, one principal object of the invention is to provide a distortion analyzer which gives both a qualitative and a quantitative measure of distortion in binary coded signals.

A further object of this invention is to provide a signal distortion analyzer which gives, on a common display, qualitative and quantitative measurements of all the significant types of binary signal distortion.

Another object of this invention is to provide a signal distortion analyzer having greater accuracy, higher reliability, and lower cost than those heretofore known in the art.

The invention is characterized by means for selectively displaying every Nth code character on a relatively long persistence cathode-ray tube, and by means for calibrating the cathode-ray tube to provide a quantitative measure of distortion in the coded signal. Briefly, in accordance with one embodiment of the invention, a signal distortion analyzer is provided which measures various kinds of transition distortion by combining a relatively long persistence cathode-ray tube with a display gating circuit which selects every Nth character for display and blanks out the characters in between. The number of characters skipped in the display is preferably chosen in accordance with the display persistence and the modulation transmission rate to provide an indication which is equivalent for purposes of analysis to that of a fast persistence cathode-ray tube which displays each character.

It should be noted that the invention provides a display which is slow enough to permit qualitative measurements but yet fast enough, in effect, to clearly distinguish the random and periodic components of distortion from the characteristic distortion. Accordingly, the invention provides both qualitative and quantitative indications of all significant types of telegraph distortion on a common display.

Other objects, features, and advantages of the invention heretofore known in the art will become more apparent to those skilled in the art from the following description when read with the accompanying drawings, wherein:

FIG. 3A shows one suitable circuit arrangement for the character counting circuit shown in FIG. 1A;

FIG. 3B is a chart showing the counting sequence of the circuit shown in FIG. 3A;

FIG. 3C is a chart showing the logical inputs to NOR gate C1 of FIG. 3A;

FIG. 3D is a set of waveforms illustrating the operation of the circuit shown in FIG. 3A.

Figure 1A:
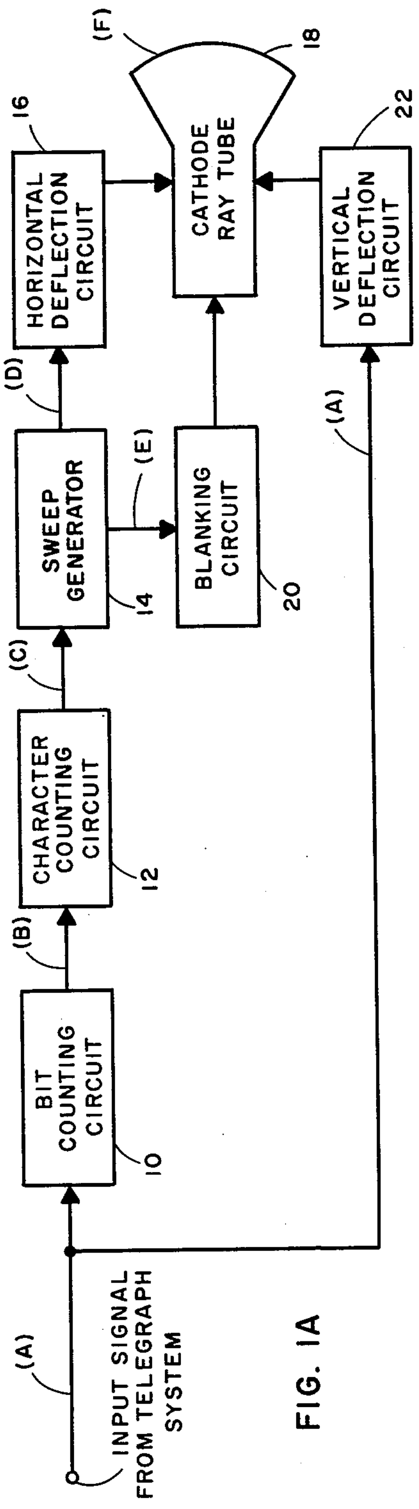
FIG. 1A is a general block diagram of a signal distortion analyzer for analyzing telegraph signals which includes a bit counting circuit, a character counting circuit and a cathode-ray tube circuit in accordance with a preferred embodiment of the invention.
Figure 1B:
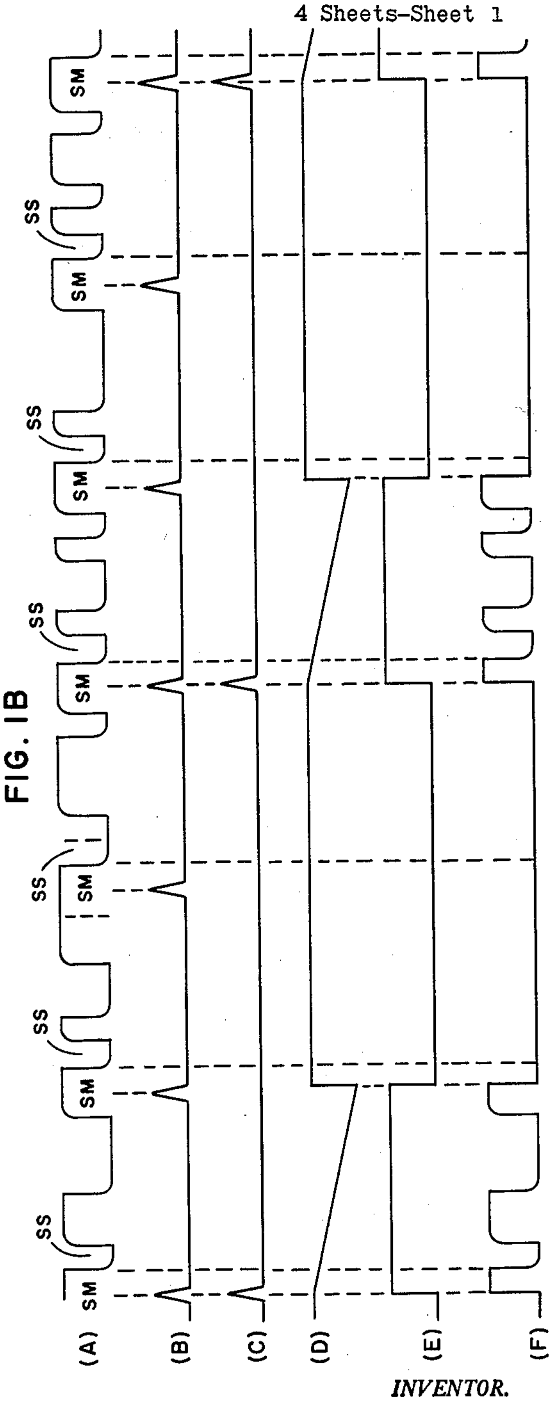
FIG. 1B is a set of waveforms illustrating the operation of the signal distortion analyzer shown in FIG. 1A.

FIG. 1A shows an embodiment of the invention which is adapted for measuring the distortion in start-stop telegraph signals. Referring to FIGS. 1A and 1B, a coded telegraph signal (A) is applied to a bit counting circuit 10, which counts the bit times of the incoming signal and produces an output pulse for each group of bits that correspond to one character of the incoming code. In the example shown, each code character contains eight bits-a start-space bit (SS), five information bits, and two stop-mark bits (SM). Therefore bit counting circuit 10 is designed to produce one output pulse for each eight bits of input signal (A), each output pulse signifying that one complete input character has just been received.

The output pulses (B) of bit counting circuit 10 are applied to a character counting circuit 12, which is adapted to produce one output pulse for each N pulses received. The number N has been shown as equal to 3 in the waveforms of FIG. 1B, but should be understood that N can be any integer, and that it is chosen to be equal to the desired ratio between characters received and characters displayed. Character counting circuit 12 is preferably variable in its count capacity; so that the ratio of characters received to characters displayed can be varied in accordance with the bit rate of input signal (A).

The output pulse signals of character counting circuit 12 are applied to a sweep generator 14 hereinafter more fully described, which is adapted to produce a sweep output (D) and an unblanking output (E), once for each input signal received. The time duration of the sweep output and unblanking output are set within sweep generator 14 to be slightly shorter than the time duration of one character of input signal (A). Therefore, the sweep terminates within the stop-mark of the corresponding character.

Sweep output (D) is applied to the conventional horizontal deflection circuit 16 of a cathode-ray tube 18, whose display is normally blanked out by a blanking circuit 20, which is adapted to activate the cathode-ray display for the duration of the unblanking gate. Input signal (A) is continuously applied to the conventional vertical deflection circuit 22 of cathode-ray tube 18. Therefore, the visual display (F) will show each input character which coincides in time with a sweep signal and an unblanking gate. All other input characters will be eliminated from the display, whereby the device will display every Nth character of the code signal but not the characters in between.

Figure 4:
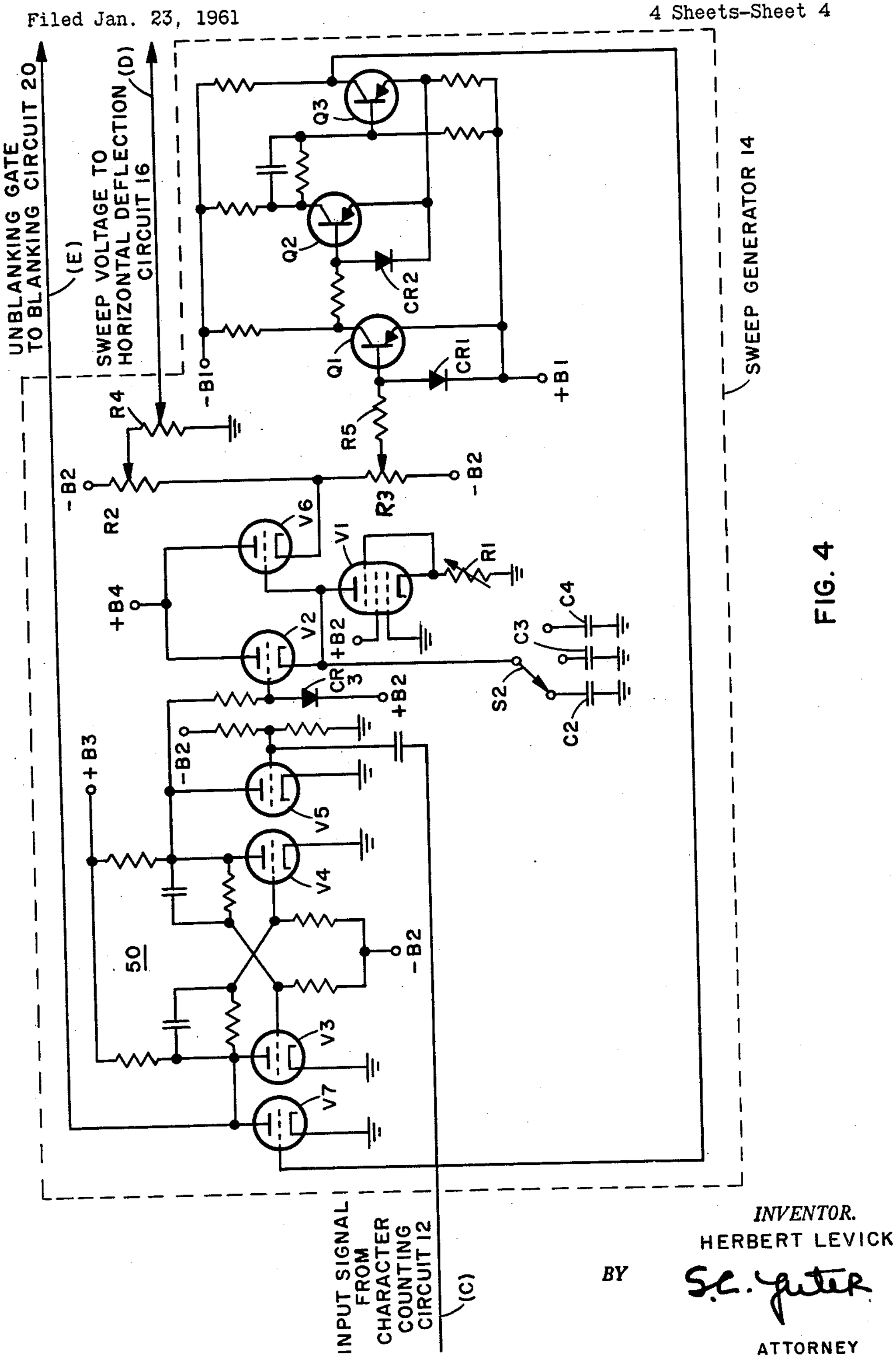
FIG. 4 shows one suitable circuit arrangement for the sweep generator circuit shown in FIG. 1A.

FIGURES 2 through 4 show a suitable embodiment of bit counting circuit 10, character counting circuit 12, and sweep generator 14 of the embodiment shown in FIG. 1A. The other circuits of this embodiment are so well known that they need no discussion, except for cathode-ray tube 18, whose display must be calibrated to provide a quantative measure of distortion, and whose persistence is preferably chosen in accordance with the modulation rate of the input signal, the type of distortion to be measured, and the ratio N between characters received and characters displayed.

The display of cathode-ray tube 18 can be calibrated in time units by enscribing a horizontal time scale on its face or by applying timing pulses to either the vertical deflection circuit 22 or blanking circuit 20. The exact time units on the scale will, of course, depend on the nature of the input signal whose distortion is to be measured on the tolerance limits of the system from which the input signal is taken. When the signal to be measured is a telegraph signal, it is preferable to also calibrate the display on a vertical current scale marked in units corresponding to the normal current values of the input signal. This will provide an amplitude measurement which, though not essential for distortion measurement, is nonetheless useful in analyzing the input signal.

With a horizontal time scale as described above, the distortion of the input signal can be measured by positioning the stop-mark start-space transition of the displayed signal at the start index point and noting the deviation between the displayed signal transition times and their theoretical transition time with respect to their stop mark-start space transition. The theoretical transition time will, of course, depend on the specific code and bit rate of the input signal, but these parameters will be known in advance to the operator.

If the display is calibrated vertically in current units, a signal amplitude measurement can be made by centering the baseline of the displayed signal on the current index and reading the current value at the top or bottom of the displayed signal pulses.

The persistence of cathode-ray tube 18 is preferably chosen in accordance with the bit rate of the input signal, the type of distortion to be measured, and the ratio N between characters received and characters displayed. In general, the persistence should be long enough to allow the operator to make a qualitative measurement of distortion but not so long as to obscure any characteristic movements which are necessary for a quantative judgment of the type or types of distortion being measured. These factors will, in practice, also govern the selection of the ratio N of signals received to signals displayed. With the specific circuits shown in FIGS. 2 through 4 a persistence of P7 has been found suitable for 7.42 and 10.42 unit telegraph code signals at 37.5, 45.45, 50, 61.12, 74.2, and 150 bits per second band in combination with a ratio N which is variable from 1 to 7.

Figure 2A:
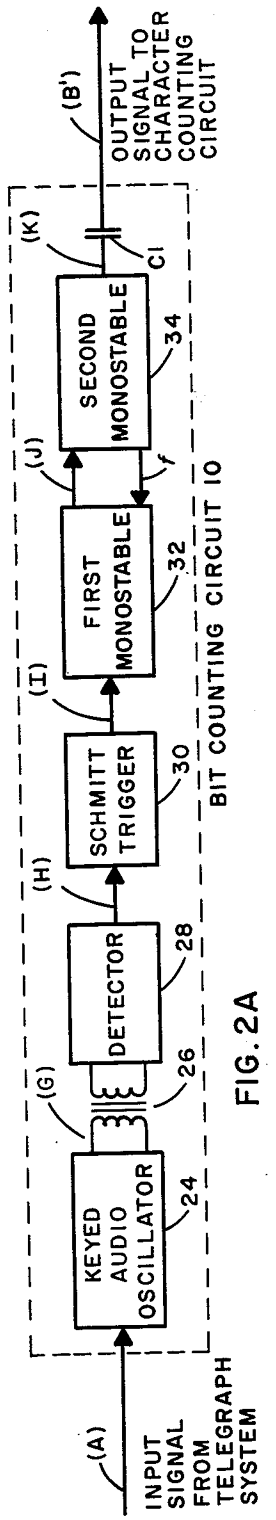
FIG. 2A shows one suitable circuit arrangement for the bit counting circuit of FIG. 1A.
Figure 2B:
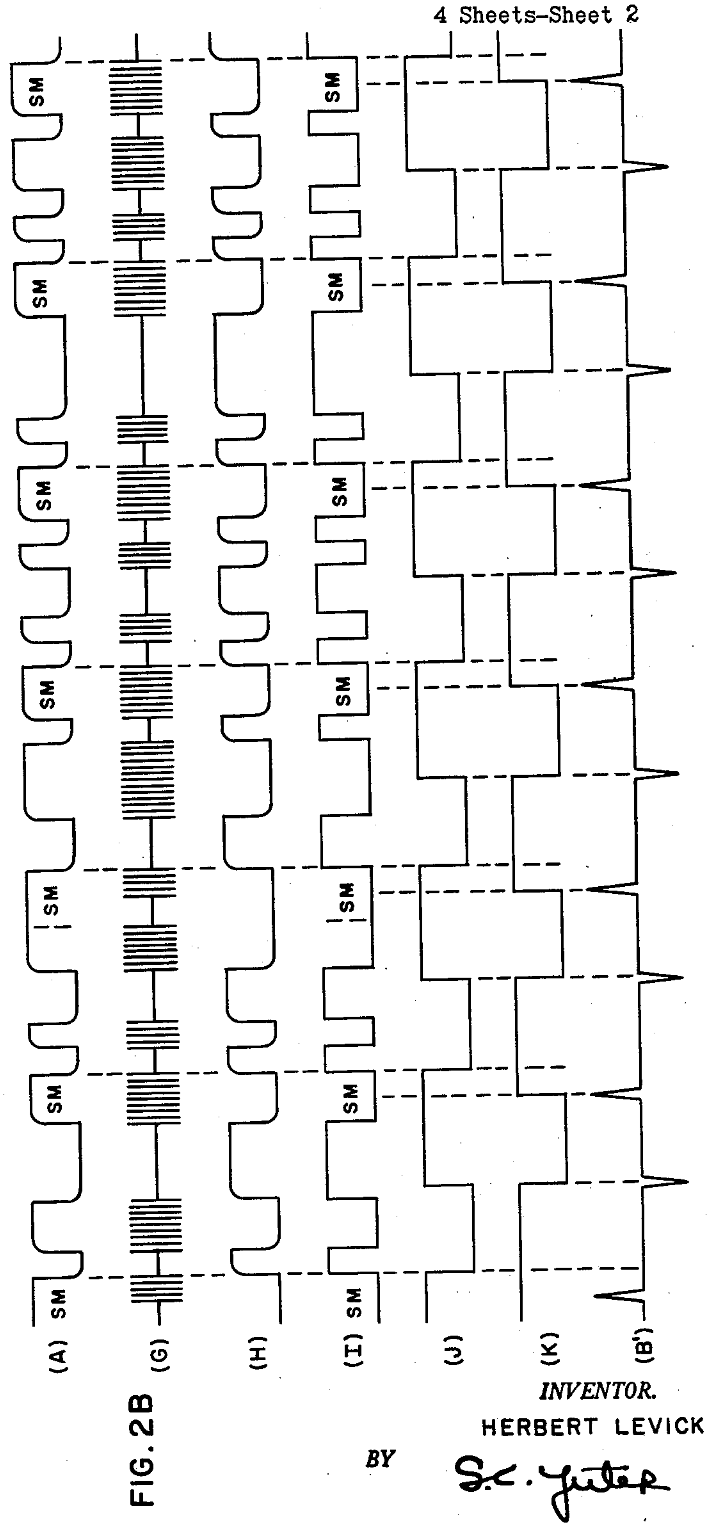
FIG. 2B is a set of waveforms for illustrating the operation of the circuit shown in FIG. 2A.

More particularly, FIG. 2A shows the bit counting circuit 10 of FIG. 1A. Referring to FIGURES 2A and 2B, the code input signal (A) is applied to a keyed audio oscillator 24 which is adapted to oscillate on each mark of the input signal to produce an audio output signal (G) which is coupled through a transformer 26 to an audio detector 28. It will be understood by those skilled in the art that oscillator 24 is preferably responsive to low input power levels to avoid undue loading of the telegraph system, and that transformer 26 provides D.C. isolation between the remaining circuits and the telegraph system.

Detector 28 rectifies and filters the audio input signal and produces an output signal (H) which may be an inverted replica of code input signal (A). Signal (H) is applied to a Schmitt trigger 30, which sharpens the signal transitions and produces a substantially square output signal I.

Signal I is applied to a first monostable 32, which is adapted to trigger on the first mark-space transition of signal I (the stop-mark, start-space transition) and to produce an output gate (J) which lasts for approximately one half of a character time of the input signal. When monostable 32 returns to its stable state it triggers a second monostable 34, whose output gate (K) is timed to end in the stop-mark following the transition which triggered the first monostable 32. A feedback signal (F) is applied from the second monostable 34 to disable the input circuit of the first monostable 32 and prevent it from triggering while the second monostable is in its unstable state. Feedback signal (F) can be a D.C. level coupled from one output terminal of the second monostable, with the polarities chosen to back bias the input triggering diode in the second monostable's unstable state but not in its stable state. Keyed audio oscillator 24, detector 28, Schmitt trigger 30, and monostables 32 and 34 may be similar to the same named components shown in the copending application of Norman Everett Peterson entitled Counter, Serial No. 702,418, filed December 12, 1957 and assigned to the same assignee.

The two monostables 32 and 34 thus produce a combined gate signal equal in length to one input character, and when the gate signal ends, a positive pulse is developed through an output capacitor C1. The cycle is repeated for each stop mark-start space transition, producing an output signal (B′) which contains a positive pulse corresponding to unstable-stable state transition of monostable 34 and a negative pulse corresponding to its stable-unstable state transition. The positive pulses act to trigger the character counting circuit 12 through triggering diodes, not shown, which also clip the negative pulses. Since its negative pulses are clipped, signal (B′) is functionally identical to signal (B) of FIGURES 1A and 1B.

FIG. 3A shows one suitable circuit arrangement for the character counting circuit 12 of FIG. 1A. Referring to FIG. 3A, signal (B′) is applied to a three stage binary counter comprising transistor bistables FF–A, FF–B, FF–C. Each bistable is adapted, by triggering diodes (not shown), to switch in response to positive triggers on its T (trigger) input terminal or R (reset) input terminal. A suitable bistable may be similar to those shown in the co-pending application Communications Monitoring System Serial No. 51,703, filed August 24, 1960, and assigned to the same assignee. When triggered on the R input terminals, the bistables either switch to or remain in the state that places a negative voltage on the unbarred output (A, B, C), and a ground on the barred output terminals ($A_1$, $B_1$, $C_1$). As is customary in transistor logic, the negative voltage represents a logical 1 and the ground a logical 0. When triggered on the T input terminals, the bistables change state.

The bistables FF–A, FF–B, and FF–C are coupled together to form a conventional binary counter whose operating sequence is shown in FIG. 3B, where the entries under each FF column indicate the output terminal which carries the logical 1 at each step of the counting sequence. Starting at the R (reset) condition, the counter advances to state 1 on the first positive pulse of signal (B′), to state 2 on the second positive pulse of signal (B′), and so on until the counter is reset.

The output signals of the bistables of FF–A, FF–B, and FF–C are coupled to a transistor NOR gate G1 through count selector switch S1, which applies a different combination of three input signals on each of its 7 positions, as shown in the chart of FIG. 3C. The positions of switch S1 are marked to indicate the number of characters to be skipped; thus, on the 0 position of S1 every character is displayed, on the 1 position every other character is displayed, and so on.

NOR gate G1, which is an inverting OR gate, operates to produce a logical 0 output when one or more of its inputs are logical 1's and to produce a logical 1 output when all of its inputs are logical 0's. NOR gate G1 is coupled to an inverter 1, which produces a positive-going output signal (C) when NOR gate G1 switches from its logical 0 output state to its logical 1 output state. Output signal (C) is fed back to the R (reset) input terminals of bistables FF–A, FF–B, and FF–C to reset the character counting circuit 12 after each positive-going output pulse from NOR gate G1.

In general terms, the character counting circut 12 of FIG. 3A operates on the principal of establishing a coincidence of 0's at NOR gate G1 at a predetermined point in the bistable counter sequence, as determined by the setting of switch S1. On the 0 position of switch S1 the coincidence will be established on the first step of the counter sequence, which will produce one positive-going pulse on output signal (C) for each positive pulse of input signal (B′). On the 6 position of switch S1 the coincidence will be established on the seventh step of the counter sequence, which will produce one positive-going pulse on output signal (C) for every 7 positive pulses of input signal (B′). On the 2 position of switch S1, one output pulse will be developed for every 3 input pulses, as shown in the waveform of FIG. 3D, which apply to the switch settings shown in FIG. 3A.

FIG. 4 shows one suitable circuit arrangement for sweep generator 14 to the embodiment shown in FIG. 1A. Referring to FIG. 4, the sweep voltage is generated by the discharge of a sweep capacitor (C2, C3, or C4) through a discharge gate V1 and discharge resistor R1, which can be adjusted to match the sweep time to the calibrations marked on the cathode-ray tube display. A bit rate switch S2 selects as the sweep capacitor one of the capacitors C2, C3, or C4, whose capacitance is chosen to give an approximately correct sweep length for a corresponding input bit rate.

In the position of S2 shown, sweep capacitor C2 is normally charged to a high positive potential +B2 through a charge gate V2, whose control grid is clamped to +B2 between sweeps by clamp diode CR3. The control grid of charge gate V2 is coupled to the normally cut-off half of a bistable 50 comprising vacuum tubes V3 and V4. When a positive pulse is applied to bistable 50 through an input amplifier V5, it is switched, cutting off charge gate V2 and allowing sweep capacitor C2 to discharge gate V1 and discharge resistor R1. The potential of sweep capacitor C2 is coupled through a cathode follower including vacuum tube V6 to two sweep output potentiometers R2 and R3, which are coupled in parallel to the cathode of vacuum tube V6. The output voltage from potentiometer R2, whose setting controls the sweep reference voltage level, is coupled through another potentiometer R4, whose setting controls the sweep amplitude, to the horizontal deflection circuit 16 (FIG. 1A). The sweep output voltage from potentiometer R3 is coupled to a threshold circuit which operates to reset the bistable 50 when the sweep reaches a voltage-level that places the cathode-ray beam of cathode-ray tube 18 (FIG. 1A) at the desired limit of its horizontal displacement. When this threshold voltage is reached, a reset signal coupled through a reset amplifier including vacuum tube V7 switches the bistable 50 back to its original state, opening charge gate V2 and ending the sweep.

The bistable and sweep generating circuits described above are conventional in every respect, and are well known to those skilled in the art. They will not be described further except to note that potential +B2 is preferably quite high, so that the sweep capacitors C2, C3, and C4 operate in a reasonably linear portion of their discharge curve, and that in its particular circuit arrangement potential +B3 is lower than potential +B4 and lower than potential +B2, and potential +B1 lower than potential +B2.

The sweep threshold circuit comprises a D.C. amplifier including transistor Q1 which is coupled to Schmitt trigger circuit which includes transistors Q2 and Q3. Transistor Q1 is biased off between sweeps by a positive potential coupled from potentiometer R3 through resistor R5; transistor Q2 is biased on by the negative collector potential of transistor Q1; and transistor Q3 is biased off by a small positive potential coupled from the collector of Q2. Since transistor Q3 is biased off, it applies a potential of −B1 to the control grid of vacuum tube V7, which cuts vacuum tube V7 off and allows the bistable 50 to be triggered to its "sweep generating" state by a positive pulse applied to the control grid of vacuum tube V5. In the sweep generating state vacuum tube V3 is biased on and vacuum tube V4 is biased off, which closes charge gate V2 and starts the discharge of sweep capacitor C2.

As sweep capacitor C2 discharges, the base potential of transistor Q1 drops from its positive level toward ground. When the base of transistor Q1 drops below the potential +B1, transistor Q1 starts conducting and cuts off transistor Q2 by raising its base potential. When transistor Q2 cuts off, it lowers the base potential of Q3, which then turns on and applies a ground voltage to the control grid of vacuum tube V7, which biases vacuum tube V7 to heavy conduction and lowers the plate potential of vacuum tube V3. When the plate potential of vacuum tube V3 drops from its positive level towards ground, a negative-going pulse is coupled to the control grid of vacuum tube V4, cutting off vacuum tube V4 and applying a saturation bias to charge gate V2, which then ends the sweep by connecting sweep capacitor C2 effectively to +B2 potential. Sweep capacitor quickly recovers the charge it lost during the sweep time, which immediately raises the base potential of transistor Q1 and switches the Schmitt trigger back to its rest state again.

From the foregoing description it will be apparent that this invention provides a distortion analyzer which gives both qualitive and quantitive measurements of all the significant types of distortion in binary coded signals. And it should be understood that this invention is by no means limited to the specific structure disclosed herein, since many modifications can be made in the structure shown without departing from the basic teaching of this invention. For example, bit counting circuit 10 could use a single monostable gate generator in place of the dual monostable shown in FIG. 2A without changing the basic circuit operation. Character counting circuit 12 need not be a bistable counter, as shown; any suitable counting such as a ring counter can be used. And, with synchronous telegraph codes, it is not necessary to include the threshold circuit (Q1, Q2, and Q3) in sweep generator 14. With synchronous inputs, the sweep flip-flop 50 will preferably be reset by clock pulses from the telegraph receiver. These and many other modifications and variations will be apparent to those skilled in the art satisfying the objects but which do not depart from the spirit of the invention as defined by the appended claims.

What is claimed is:

1. Apparatus for analyzing information signals occurring in groups which may be transmitted at different rates, comprising means for counting said groups, means for generating a control signal for every Nth group counted, means for increasing the number N as said rate of transmission increases, and signal display means having first and second inputs for receiving said information signals and said control signals respectively to display only every Nth group of said information signals, wherein N is any positive integer equal to or greater than 1.

2. An apparatus for analyzing telegraph signals representing characters of information wherein each character is represented by a coded group of telegraph signals, said telegraph signals being transmittable at different rates, means for counting said coded groups of telegraph signals, means for generating a control signal for every Nth group counted, means for adjusting said control signal generating means for increasing the number N as said rate of transmission increases, and signal display means having first and second inputs for receiving said telegraph signals and said control signals respectively, to display only every Nth group of said telegraph signals, wherein N is any positive integer equal to or greater than 1.

3. Apparatus for analyzing information signals representing characters of information wherein each character is represented by a coded group of information signals comprising means for counting said characters, means for generating a control signal for each Nth character counted, and cathode-ray tube display means having first and second inputs for receiving said information signals and said control signals respectively, for displaying only every Nth character of information, wherein N is any positive integer equal to or greater than 1.

4. The apparatus of claim 3 wherein said cathode-ray tube means includes horizontal deflection means responsive to said control signals and vertical deflection means responsive to said information signals.

5. The apparatus of claim 3 wherein said information signals are transmittable at different rates, and means for adjusting said control signal generating means for increasing the number N as said rate of transmission increases.

6. Apparatus for analyzing telegraph signals representing characters of information wherein each character is represented by a coded group of telegraph signals comprising, means for counting said characters, means for generating a control signal for each Nth character counted, wherein N is any positive integer equal to or greater than 1, sweep generator means responsive to said control signals for generating a sweep voltage having a duration substantially equal to the duration of a character, cathode-ray tube means having a horizontal deflection means and a vertical deflection means, means for applying said sweep voltage to said horizontal deflection means, and means for applying said telegraph signals to said vertical deflection means.

7. The apparatus of claim 6 wherein said cathode-ray tube means includes a blanking circuit means and said sweep generator means also generates a gating voltage, and means for applying said gating voltage to said blanking circuit means for permitting a display for only every Nth character received.

8. The apparatus of claim 7 wherein the telegraph characters are transmittable at different rates, and means for increasing the number N as said rate of transmission increases.

9. Apparatus for analyzing telegraph signals representing characters of information wherein each character is represented by a coded group of bits comprising means for detecting the occurrence of each character, means for generating a character signal during the occurrence of each character, binary counter means for counting character signals, output means included in said binary counter means for generating a control signal for each Nth character counted, wherein N is any positive integer equal to or greater than 1, a cathode-ray oscilloscope having a horizontal deflection circuit, a vertical deflection circuit and a blanking circuit, a bistable circuit, means for coupling said bistable circuit to the output means of said binary counter means for triggering said bistable circuit to a first stable state upon receipt of each control signal, a sawtooth voltage generator for generating a sweep voltage during the time said bistable circuit is in the first stable state, a voltage amplitude threshold circuit coupled to said sawtooth voltage generator for generating a reset signal when said sweep voltage reaches a predetermined amplitude, means for coupling said voltage amplitude threshold circuit to said bistable circuit for causing said bistable circuit to assume a second stable state upon receipt of a reset signal, means for coupling said sweep generator to said horizontal deflection circuit, means for applying the received telegraph signals to said vertical deflection circuit, means for coupling said sweep voltage generator to said horizontal deflection circuits and means for coupling said blanking circuit to said bistable circuit for permitting a display for only every Nth character received.

10. Apparatus for analyzing transmitted telegraph signals representing characters of information wherein each character is represented by a coded group of bits comprising means for detecting the occurrence of each character, means for generating a character signal during the occurrence of each character, binary counter means for counting character signals, output means included in said binary counter means for generating a control signal for each Nth character counted, wherein N is any positive integer equal to or greater than 1, means for changing the value of N for different transmission rates, a cathode-ray oscilloscope having a horizontal deflection circuit, a vertical deflection circuit and a blanking circuit, a bistable circuit, means for coupling said bistable circuit to the output means of said binary counter means for triggering said bistable circuit to a first stable state upon receipt of each control signal, a sawtooth voltage generator for generating a sweep voltage during the time said bistable circuit is in the first stable state, a voltage amplitude threshold circuit coupled to said sawtooth voltage generator for generating a reset signal when said sweep voltage reaches a predetermined amplitude, means for coupling said voltage amplitude threshold circuit to said bistable circuit for causing said bistable circuit to assume a second stable state upon receipt of a reset signal, means for coupling said sweep generator to said horizontal deflection circuit, means for applying the received telegraph signals to said vertical deflection circuit, means for coupling said sweep voltage generator to said horizontal deflection circuits and means for coupling said blanking circuit to said bistable circuit for permitting a display for only every Nth character received.

11. Apparatus for analyzing information signals occurring in groups comprising means for counting said groups, means for generating a control signal for every Nth group counted, and signal display means responsive to both said information signals and said control signals for displaying every Nth group of said information signals; said means for generating a control signal including means for adjusting the value of N where N is any real, positive integer equal to or greater than 1, said counting means comprising a binary counter having a plurality of flip-flop stages; said control signal generating means comprising a logic gate having input terminals connected to output terminals of said binary counter, said logic gate generating an output in the absence of signals at its input terminals, the output of said logic gate being connected to control energization of said signal display means.

12. Apparatus for analyzing information signals occurcuring in groups comprising means for counting said groups, means for generating a control signal for every Nth group counted, and signal display means responsive to both said information signals and said control signals for displaying every Nth group of said information signals; said means for generating a control signal including means for adjusting the value of N where N is any real, positive integer equal to or greater than 1, said counting means comprising a binary counter having a plurality of flip-flop stages; said control signal generating means comprising a logic gate having input terminals connected to output terminals of said binary counter said logic gate generating an output in the absence of signals at its input terminals, the output of said logic gate being connected to control energization of said signal display means, manually operable control means movable between a plurality of N discrete positions connected between said binary counter and said logic gate for controlling the connections between the output terminals of said binary counter and the input terminals of said logic gate in response to the positioning of said control means, each of said N different positions providing for the generation of N different control signals.

References Cited in the file of this patent

UNITED STATES PATENTS

| | | |
|---|---|---|
| 2,077,172 | Hearn | Apr. 13, 1937 |
| 2,504,999 | McWhirter et al. | Apr. 25, 1950 |
| 2,563,841 | Jensen | Aug. 14, 1951 |
| 2,712,038 | Carber | June 28, 1955 |
| 2,767,313 | Martinelli | Oct. 16, 1956 |